United States Patent
Dzhidzhora et al.

(10) Patent No.: US 11,613,866 B1
(45) Date of Patent: Mar. 28, 2023

(54) RETAINER FOR CLOSURE DEVICE

(71) Applicant: NUSFC, LLC, Neenah, WI (US)

(72) Inventors: Oleg Dzhidzhora, Weston, FL (US); Adam W. San Solo, North Miami Beach, FL (US)

(73) Assignee: NUSFC, LLC, Neenah, WI (US)

( * ) Notice: Subject to any disclaimer, the term of this patent is extended or adjusted under 35 U.S.C. 154(b) by 323 days.

(21) Appl. No.: 16/811,489

(22) Filed: Mar. 6, 2020

Related U.S. Application Data (60) Provisional application No. 62/861,414, filed on Jun. 14, 2019.

(51) Int. Cl.
| | |
|---|---|
| *F16B 13/04* | (2006.01) |
| *E02D 29/14* | (2006.01) |
| *F16B 37/04* | (2006.01) |
| *F16B 41/00* | (2006.01) |

(52) U.S. Cl.
CPC ........ *E02D 29/1427* (2013.01); *F16B 37/044* (2013.01); *F16B 37/045* (2013.01); *F16B 41/002* (2013.01)

(58) Field of Classification Search
CPC ... E02D 29/14; E02D 29/1427; F16B 41/002; F16B 41/00; F16B 37/045; F16B 37/044
USPC ...................... 292/256.73; 411/25, 103, 119
See application file for complete search history.

(56) References Cited

U.S. PATENT DOCUMENTS

| | | | | |
|---|---|---|---|---|
| 2,922,456 | A * | 1/1960 | Kann | F16B 41/002 411/965 |
| 3,041,913 | A * | 7/1962 | Liska | F16B 5/0208 411/87 |
| 4,295,766 | A * | 10/1981 | Shaw | F16B 37/14 411/113 |
| 4,321,759 | A * | 3/1982 | Gamble | D21F 5/021 165/146 |
| 4,723,966 | A | 2/1988 | Fuderer | |
| 4,761,093 | A * | 8/1988 | Seymour | F16B 7/025 403/237 |
| 4,768,907 | A * | 9/1988 | Gauron | F16B 37/044 411/85 |
| 4,819,954 | A * | 4/1989 | Fucci | F16B 41/002 277/640 |
| 4,830,557 | A * | 5/1989 | Harris | F16B 37/044 411/113 |

(Continued)

*Primary Examiner* — Gary W Estremsky
(74) *Attorney, Agent, or Firm* — Foley & Lardner LLP (57) ABSTRACT

Disclosed is retainer for a nut. The retainer is positioned within the frame that provides access to a closure. The closure, in turn, is secured by way of a removable cover. The cover is removably secured to the frame by way of a series of bolts and corresponding nuts. The nuts are secured by way of the retainer to allow the bolts to be secured. Each retainer includes upper and lower opening and an internal area. The upper opening is preferably angled such that the nut must be oriented at an angle in order to be inserted into the retainer. The internal area of each retainer includes a ledge with an angled step. The angled step function is rotating the nut to a horizontal orientation after it has been inserted into the retainer. Thereafter, a user can access the nut with a finger through the lower opening. This allows the nut to be rotated and removed via the upper opening. The various features of the present retainer, and the manner in which they interrelate, are described in greater detail hereinafter.

13 Claims, 6 Drawing Sheets

(56) References Cited

U.S. PATENT DOCUMENTS

| | | | | |
|---|---|---|---|---|
| 4,853,960 A | * | 8/1989 | Smith | H04M 1/24 |
| | | | | 379/438 |
| 5,096,349 A | * | 3/1992 | Landy | B23P 9/025 |
| | | | | 411/113 |
| RE34,892 E | * | 4/1995 | Dunwoodie | B65D 88/14 |
| | | | | 220/691 |
| 7,712,515 B2 | | 5/2010 | Sulak et al. | |
| 2003/0039510 A1 | * | 2/2003 | Kuan | E02D 29/1427 |
| | | | | 404/25 |
| 2004/0161317 A1 | * | 8/2004 | Jones | F16B 5/0208 |
| | | | | 411/433 |
| 2005/0196238 A1 | | 9/2005 | DeGreef | |

* cited by examiner

RETAINER FOR CLOSURE DEVICE

RELATED APPLICATION DATA

This application claims priority to Provisional Application Ser. No. 62/861,414 filed on Jun. 14, 2019 and entitled "Retainer for Closure Device." The content of this application is fully incorporated by reference herein for all purposes.

TECHNICAL FIELD

The present disclosure relates to a retainer for a closure device. More specifically, the disclosure relates to a retainer that forms part of the closure and that houses a fastener.

BACKGROUND OF THE INVENTION

Closure devices are often used to create an access point for various types of infrastructure. This infrastructure can include, for example, municipal structures such as underground sewers, storm drains, or utility vaults. Closure devices usually include a frame for creating an opening to the infrastructure and a removable cover for controlling access. In one example, a manhole frame can provide access to an underground sewer system with the manhole cover being removably secured thereto. Regardless of the specific application, access to the associated infrastructure must often be controlled. This may be necessary due to the sensitive nature of the infrastructure or to prevent access by terrorists, thieves, or vandals. For these reasons, it may be desirable to secure the cover by bolting it to the surrounding frame.

Various types of cover locking mechanisms are known in the art. For example, U.S. Patent Publication 2005/0196238 to DeGreef discloses locking mechanism for a sewer grate. The locking mechanism includes a grate hold down device, a threaded nut attached to the mounting frame below the hold-down device, and a bolt extending downwardly through the hold down device and into threaded engagement with the nut. The head of the bolt is constructed so that a specially formed wrench is required to unscrew it.

Furthermore, U.S. Pat. No. 4,723,966 to McCaulty discloses a locking bolt construction for manhole cover. The construction allows a manhole cover to be locked to an associated frame. The locking bolt includes a bolt having a threaded shank and an externally threaded head. The head further includes a curvilinear groove for receiving the key from a mating configuration. The key allows the bolt to be threaded into and out of the manhole cover frame.

Although the foregoing examples each achieve their own unique objective, they all suffer from drawbacks. Mainly, these examples all require non-standard bolts or other unique fastening mechanisms in order to secure the cover. This needlessly increases the cost of the closure, complicates installation efforts, and makes the act of opening or closing the device difficult.

Other known closures device use standard bolts that are secured by conventional nuts. In some cases, the frame includes one or more shelves for securing the locking nut and allowing the bolt to be properly secured. These shelves include a side opening for allowing the nut to be slid into place. This is helpful in that it allows the nut to be easily installed or removed without additional tools. However, these shelves also suffer from a significant drawback in that the nut is left unsecured and often falls out of the opening prior to the bolt being installed. For this reason, at least one attempt has been made to improve upon this design.

U.S. Pat. No. 7,712,515 to Sulak discloses a municipal casting frame. The frame of Sulak includes cast nut retainers that allow the frame to be used with a bolt down cover. In one embodiment, the nut retainer includes protrusions that require the nut to be snap fit into the nut retainer. In another embodiment, the nut retainer is configured to frictionally receive the nut in a wedging interaction. Although this construction beneficially retains the nut in place, it also suffers from drawbacks. The protrusions require complicated manufacturing techniques and necessitates complex molds. Furthermore, the protrusions greatly complicate efforts to remove a nut once in place. The device of the present disclosure is aimed at overcoming these and other known shortcomings present in the background art.

SUMMARY OF THE INVENTION

This disclosure relates to closure device with a retainer for a fastening element and which allows the closure to be quickly and easily secured.

The disclosed system has several important advantages. For example, the closure allows a cover to be secured to an associated frame using standard fastening elements.

A further possible advantage is the use of a retainer for securing a nut such that bolt can be easily fastened or unfastened.

Still yet another possible advantage of the present system is realized by providing a retainer with an opening that is sized to allow an angled nut to be inserted and removed.

Another advantage of the present system is achieved by providing a nut retainer that is integrally formed within a closure frame and that eliminates a laterally positioned opening, thereby lessening the possibility of the nut accidentally falling out of the retainer.

Yet another advantage is fulfilled by providing a retainer that can secure a fastener without the need for protrusions or detents.

Another advantage is attained by providing a retainer with an opening that is sized to accommodate the finger of a user and that can be accessed to remove a fastener positioned within the retainer.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

Similar reference numerals refer to similar parts through the several views of the drawings.

DETAILED DESCRIPTION OF THE DRAWINGS

This disclosure relates to a retainer that is used for a closure device. The retainer is positioned within the frame and is used to hold a fastener, such as a nut. The closure further includes a removable cover. The cover is removably secured to the frame by way of a series of bolts and corresponding nuts. The nuts are secured within the retainer and allow the bolts to be fastened. Each retainer includes upper and lower openings and an internal area. The upper opening is preferably angled such that the nut must be positioned at an angle in order for it to be inserted into the retainer. The internal area of each retainer includes a ledge with an angled step. The angled step function is rotating the nut to a horizontal orientation after it has been inserted into the retainer. Thereafter, a user can access the nut with a finger through the lower opening. This allows the nut to be rotated to be proper orientation such that it can be removed via the upper opening. The various features of the present retainer, and the manner in which they interrelate, are described in greater detail hereinafter.

Figure 1:
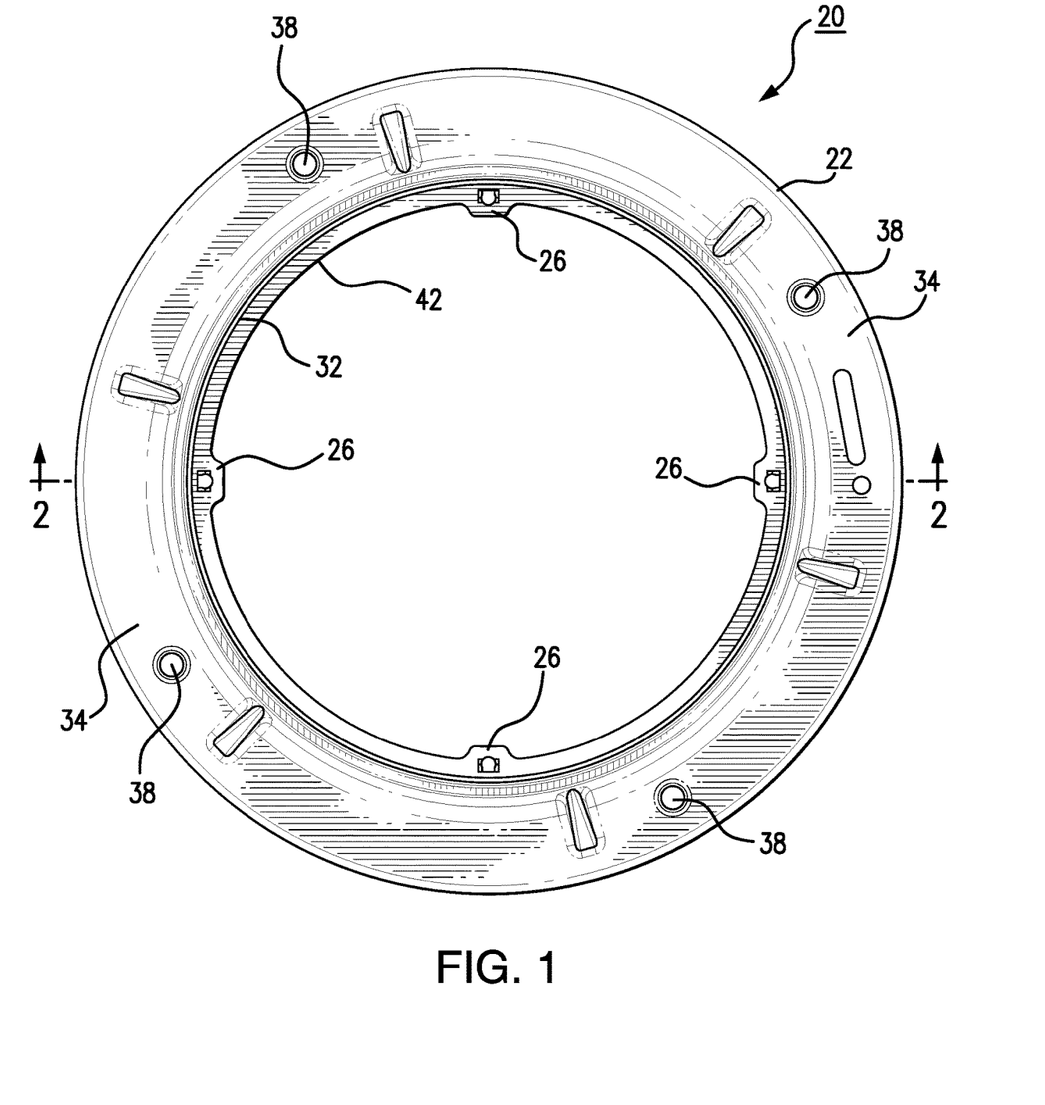
FIG. 1 is a top plan view of the frame employed by the device.
Figure 2:
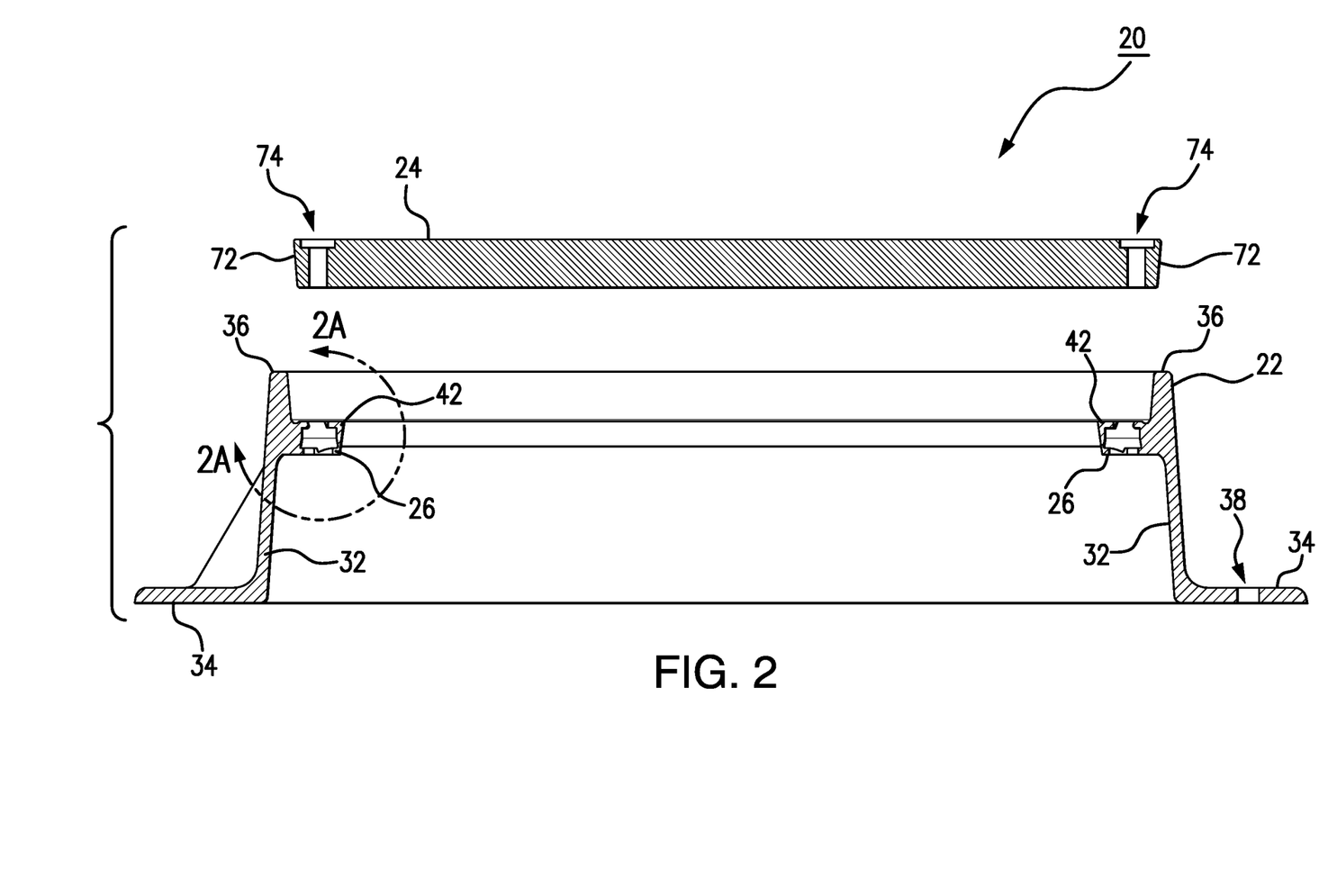
FIG. 2 is a is cross sectional view taken along line 2-2 of FIG. 1.

FIGS. 1 and 2 illustrate the closure device (20) with frame (22) and cover (24). Frame (22) includes a series of radially spaced retainers (26). Frame (22) and cover (24) may provide an access point to a closure (28). In one embodiment, frame (22) provides access to underground infrastructure, such as a sewer, storm drain, or utility vault. Although frame (22) is illustrated as being circular, the use of other shapes (such as square or oblong) is within the scope of the present disclosure. Frame (22) is defined by an inner peripheral wall (32), a lower shoulder (34) and an upper edge (36) (FIG. 2). Lower shoulder (34) can take the form of a flange that extends about the entire periphery of frame (22). Shoulder (34) can be used in securing frame (22) in place within the ground. For example, shoulder (34) can include bolt holes (38) for allowing bolts to secure frame (22) to an associated foundation or structure Shoulder (34) may also serve as an anchor for the frame (22) when it is secured within a poured concrete or asphalt foundation. Shoulder (34) further includes a ledge (42) formed along inner peripheral wall (32). As illustrated in FIG. 2, ledge (42) is ideally formed at a location adjacent upper edge (36). The space between ledge (42) and edge (36) is dimensioned to receive cover (24).

Frame (22) houses a series of nut retainers (26). In a preferred but nonlimiting embodiment, four nut retainers (26) are integral with and equally spaced along ledge (42) of the frame (22). These four nut retainers (26) are depicted in FIG. 1, with the structure of each nut retainer (26) depicted in the detailed cross-sectional views of FIGS. 2A and 2B. As illustrated, each nut retainer (26) includes upper and lower openings (44 and 46). Ideally, upper opening (44) is angled with respect to lower opening (46). In one embodiment, this is achieved by angling one of the opposing edges (50) of upper opening (44). Nonetheless, angled opening (44) can also be achieved by angling either or both edges (50). Lower opening (46), however, is preferably not angled. Both openings (44 and 46) provide access to the internal area (52) of retainer (26). Internal area (52) is sized to receive a fastening element. In the depicted embodiment, fastening element is a nut (54) that can be threadably secured to an associated bolt (56). Nonetheless, the use of other standard fastening elements (such as washers or shims) is within the scope of this disclosure. Internal area (52) includes upper and lower extents (58 and 62), with the upper extent (58) having a width (i.e. the "first width") that is less wide than the width of the lower extent (62) (i.e. the "second width"). Each nut retainer further includes a ledge (64) with a v-shaped step (66). As illustrated in FIG. 3, ledge (64) is formed within the internal area (52) of retainer (26) at a position that is adjacent to lower opening (46). FIG. 3 illustrates the internal area (52) including only one such ledge (64), but it is within the scope of the present disclosure to include opposing ledges (64), each with an associated step (64). Step (64) and also be replaced by an upwardly extending protrusion.

FIG. 2 illustrates the circular cover (24) that fits within the corresponding frame (22). Again, although the depicted cover (24) is circular, it is within the scope of the present disclosure to utilize other shapes (such as square or oblong) to accommodate different sized frames. Cover (24) depicted in FIG. 2 includes a peripheral edge (72). The lower surface of cover (24) is adapted to be removably positioned upon ledge (42) of frame (22). Cover (24) can thereafter be secured by inserting bolts (56) into bolt holes (74) formed within periphery (72) of cover (24). As illustrated, cover (24) includes a series of four bolt holes (74) that are equally spaced about peripheral edge (72) and that correspond to the position and number of the nut retainers (26). Although the use of four bolt holes (74) and nut retainers (26) is depicted, any number can be employed and the number utilized will depend upon the intended application.

Each nut (54) is positioned within internal area (52) of an associated retainer (26). In this regard, each of nut retainer (26) is dimensioned to receive a standard nut (54). For example, retainer (26) can be dimensioned to receive a standard ⅜ inch nut, 7/16 inch nut, or ½ inch nut. Other standardized sizes will be readily apparent to those of ordinary skill in the art. Regardless of the size, nut (54) will be defined by a top and bottom (54*a*) having a width and opposing sides (54*b*) having a height. The upper opening (44) is ideally dimensioned to receive the corresponding nut (54) when it is oriented on its side (e.g. inserted from the side). In other words, the insertion of nut (54) is accomplished by first orientating nut (54) at an angle such that the side (54*b*) of nut (54) is aligned with respect to opening (44). In one embodiment, insertion is achieved by rotating nut (54) so that it is at an angle that matches the angle of opening (44). This angle may also match the angle of step (64). The width of the upper opening (44) is dimensioned to allow nut (54) to be inserted when oriented at this angle. This angle, for example, may be anywhere from 15 to 90 degrees relative to vertical. Opening (44) is too narrow to permit the bottom or top (54*a*) of nut (54) to be inserted into opening (44).

Figure 2A:
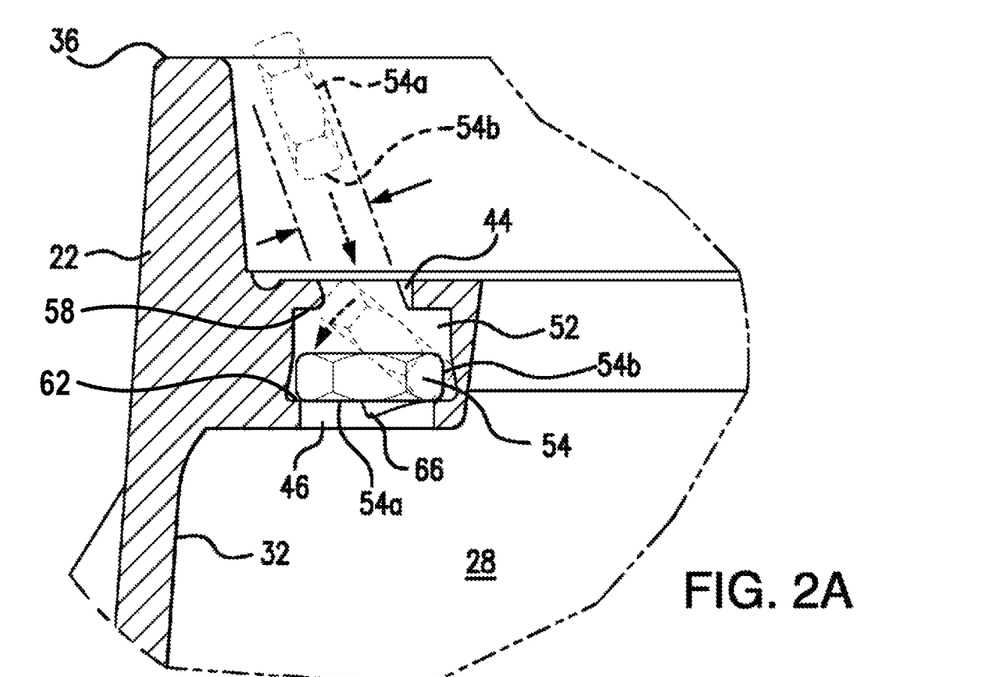
FIG. 2A is a detailed view taken from FIG. 2.
Figure 2B:
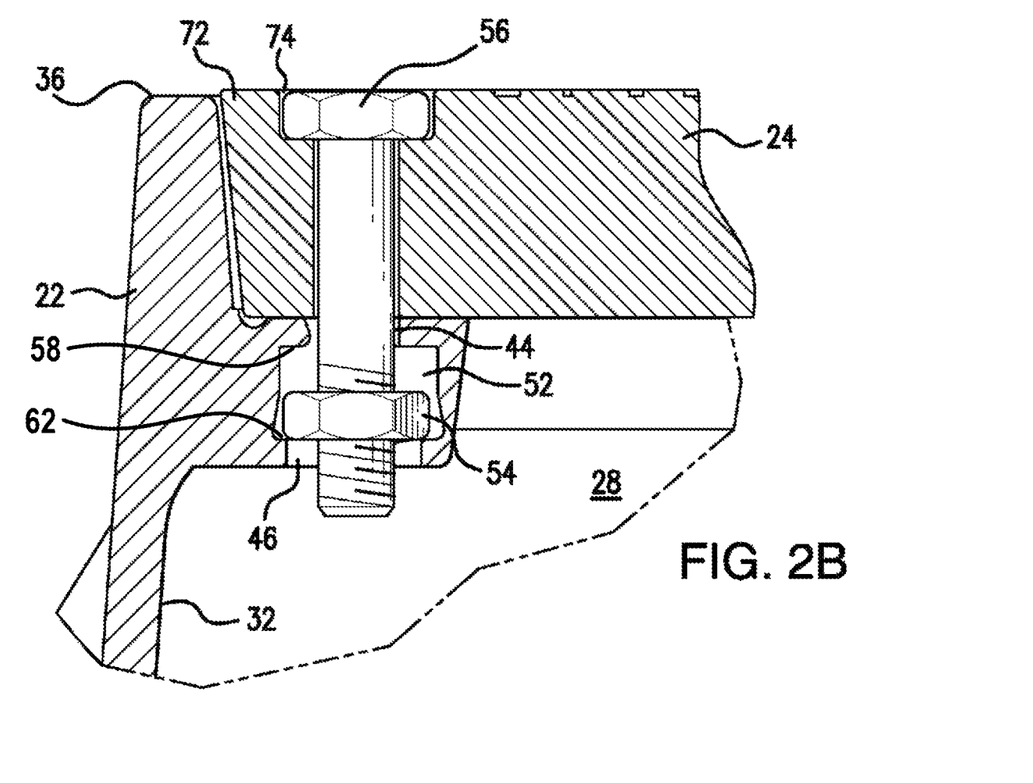
FIG. 2B is a detailed view showing the bolt secured to the cover and frame.
Figure 3:
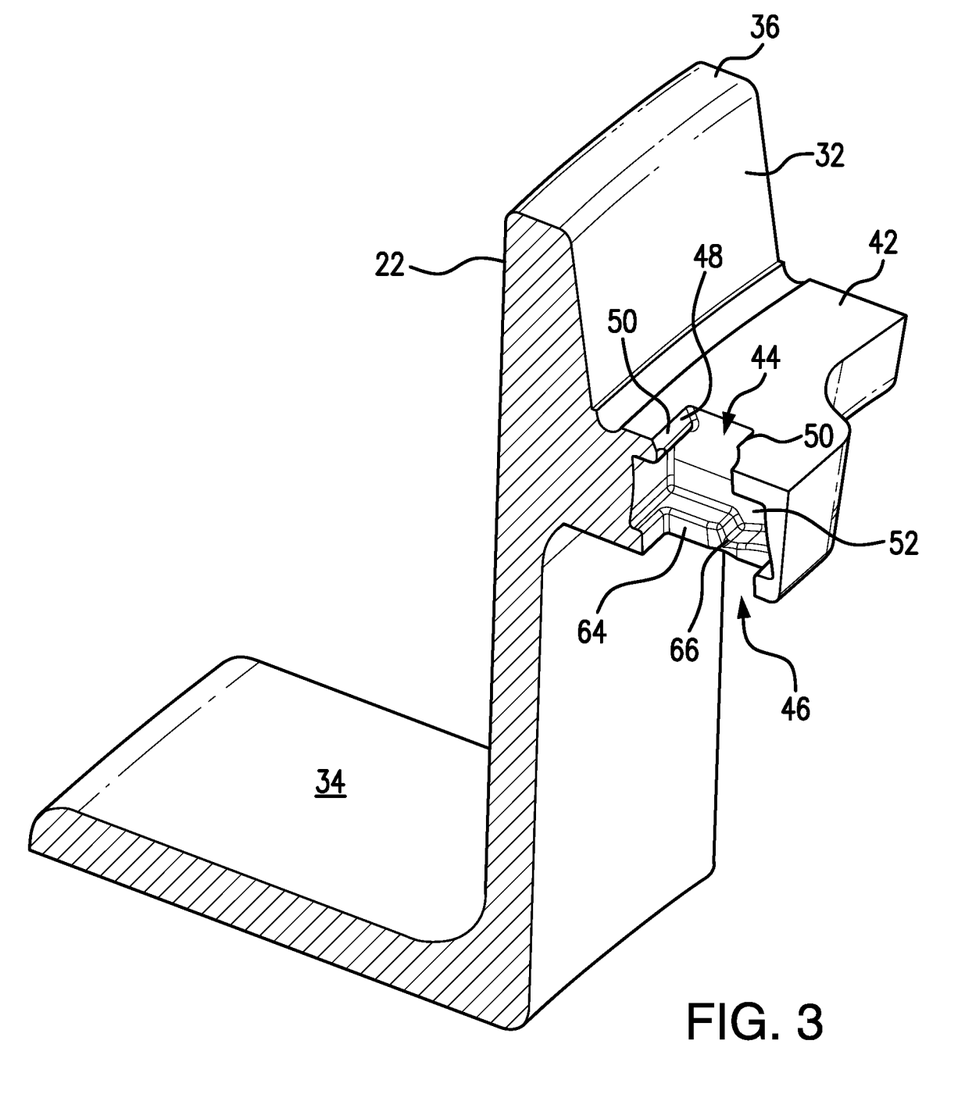
FIG. 3 is a perspective, sectional view of the nut retainer.
Figure 4:
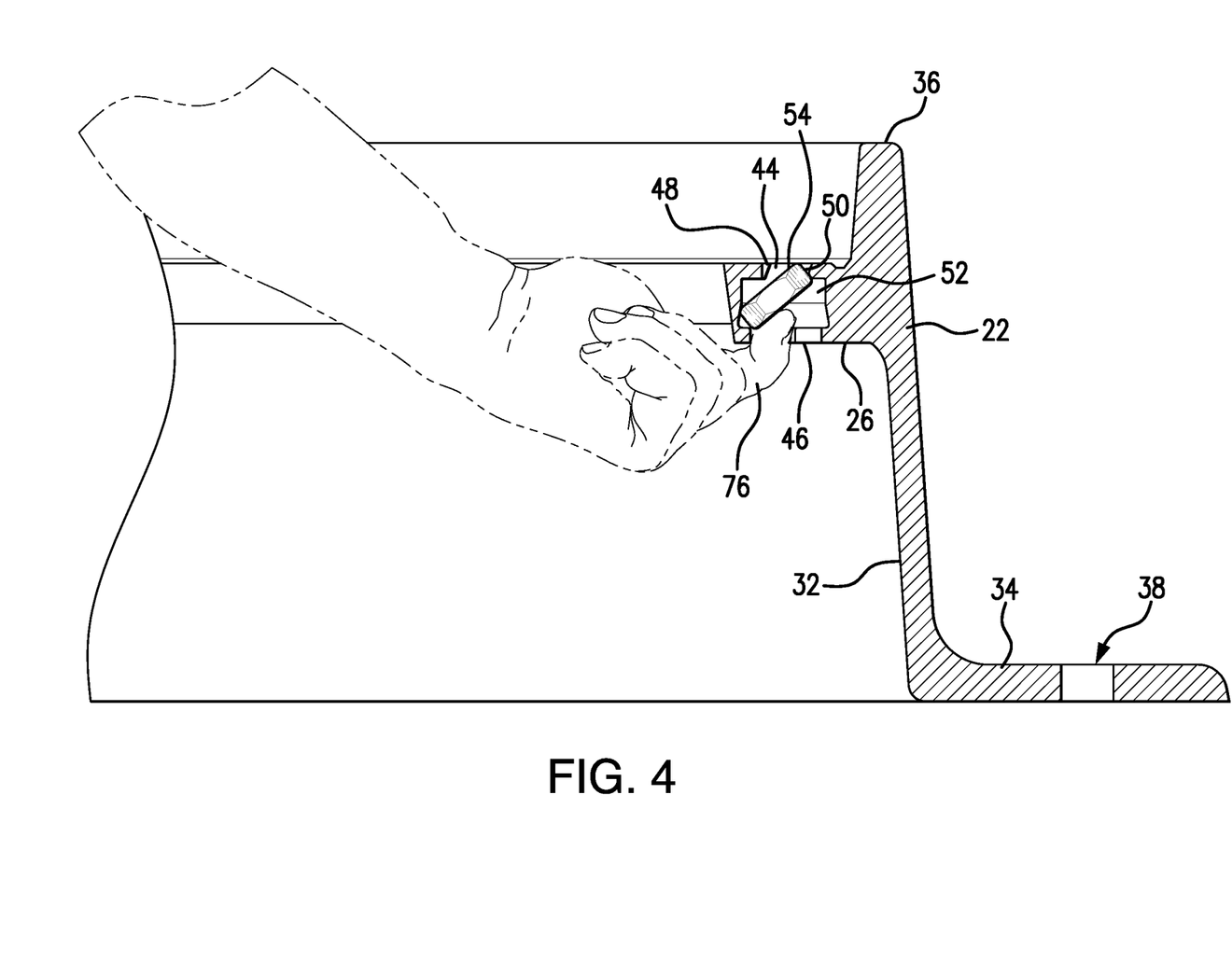
FIG. 4 is a sectional view showing the nut being removed from the retainer.

Regardless of the degree selected, as illustrated in phantom in FIG. 2A, the angle of the nut (54) must match the angle of the upper opening (44) for the insertion to be successful. Thereafter, the side of nut (54) will encounter the v-shaped step (66) within internal area (52). This v-shaped step (66) functions in rotating nut (54) from its angled orientation back into a horizontal orientation. In this orientation, the bottom (54*a*) of nut (54) contacts the bottom of internal area (52). The horizontal orientation of nut (54) is depicted by the solid lines of FIG. 2A. Lower opening (46) is preferably smaller than upper opening (44) and prevents nut (54) from falling out of the bottom of the retainer (26). Thereafter, a series of bolts (56) can be secured through the bolt holes (74). This can be achieved without additional tools insomuch as the nuts (54) are secured within their respective nut retainer (36).

Figure 5:
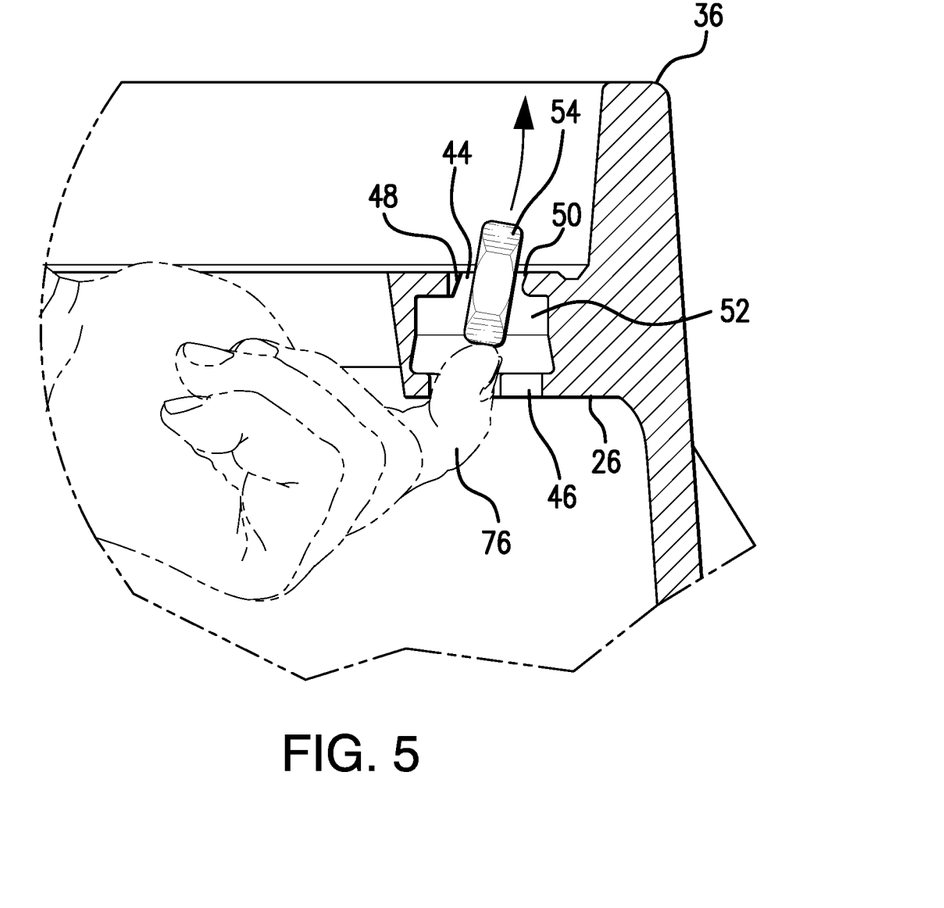
FIG. 5 is an additional sectional view showing the nut being removed from the retainer.

With reference to FIG. 5, the process of removing a nut (54) from its retainer (26) is described. Ideally, the lower opening (46) is sufficiently narrow to preclude passage of nut (54), but is nonetheless large enough to allow a user to insert his or her finger (76) into internal area (52). As illustrated in FIG. 5, this allows nut (54) to be rotated to an angle that matches the angle of upper opening (44). Upon this orientation being achieved, nut (54) can be withdrawn from upper opening (44) and removed from retainer (26).

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A closure device for an underground structure, the closure device comprising:
   a circular frame including an inner periphery, a lower shoulder, an upper edge, a frame ledge positioned below the upper edge and extending about the inner periphery, the frame functioning to provide an access point to the underground structure;
   a series of nut retainers equally spaced along the frame ledge, each nut retainer including upper and lower openings, with the upper opening being angled with respect to the lower opening, each nut retainer including an internal area defined by an upper extent having a first width and a lower extent having a second wider width, each nut retainer further including a retainer ledge with a v-shaped step, the retainer ledge formed within the internal area and adjacent to the lower opening;
   a circular cover with a peripheral edge, the cover adapted to be removably positioned upon the frame ledge with the cover placed in the frame, the cover including a series of bolt holes equally spaced about the peripheral edge, with the number and position of the bolt holes corresponding to the number and position of the nut retainers;
   a nut positioned within the internal area of each of the nut retainers, each nut having an outer diameter and a height, with the height dimensioned to allow the nut to pass through the upper opening at an angle that matches the angle of the upper opening, and whereby the v-shaped step functions in rotating the nut into a horizontal orientation once the nut is inside the internal area; and
   a series of bolts secured through the bolt holes and nuts and securing the cover to the frame.

2. A closure device for a structure, the closure device comprising:
   a frame including an upper edge and a frame ledge positioned below the upper edge, the frame functioning to provide an access point to the structure;
   a series of nut retainers spaced along the frame ledge, each nut retainer including upper and lower openings, with the upper opening being angled with respect to the lower opening, each nut retainer including an internal area, each nut retainer further including a retainer ledge with a step, the retainer ledge formed within the internal area and adjacent to the lower opening;
   a cover with an edge, the cover adapted to be removably positioned upon the frame ledge with the cover placed in the frame, the cover including a series of bolt holes spaced about the edge, with the number and position of the bolt holes corresponding to the number and position of the nut retainers; and
   a nut positioned within the internal area of each of the nut retainers, each nut having a width and a height, with the height dimensioned to allow the nut to pass through the upper opening at an angle that matches the angle of the upper opening, with the step functioning in rotating the nut into a horizontal orientation once the nut is inside the internal area.

3. The closure device as described in claim 2 wherein the frame and the cover are circular and the nut retainers are equally spaced about a periphery of the frame.

4. The closure device as described in claim 2 wherein the internal area is defined by upper and lower extents and wherein the lower extent is wider than the upper extent.

5. The closure device as described in claim 4 wherein the lower extent is wider than the width of the nut.

6. The closure device as described in claim 2 wherein the nut must be rotated to an angle of between 15 to 90 degrees relative to horizontal before it can be inserted through the upper opening.

7. The closure device as described in claim 2 wherein the step is v-shaped.

8. The closure device as described in claim 2 wherein a protrusion is formed upon the retainer ledge and functions in rotating the nut to a horizontal position.

9. The closure device as described in claim 2 wherein the structure is underground.

10. A retainer for a fastener, the fastener being used to secure a cover to a frame, the fastener having a width and a height, the retainer comprising:
    a housing formed within the frame and including an internal area and an upper surface positioned above the internal area;
    an upper opening formed within the housing and extending through the upper surface, the upper opening having a width that is slightly larger than the height of the fastener, the upper opening providing access to the internal area;
    a lower opening formed within the housing, the lower opening having a width that is slightly smaller than the width of the fastener, the lower opening providing access to the internal area; and
    a ledge formed within the internal area and adjacent to the lower opening, the ledge including a step that functions in orienting the fastener into a horizontal position once inside the internal area,
    wherein the upper opening is angled and whereby the fastener must be oriented at a similar angle to be inserted into the internal area, and wherein the step is formed at an angle, with the angle of the step matching the angle of the upper opening.

11. The fastener retainer as described in claim 10 wherein a user can insert their finger into the lower opening to rotate the fastener, such that the fastener can be removed from the retainer through the upper opening.

12. The retainer as described in claim 10 wherein the fastener is a nut.

13. A retainer for a fastener, the fastener being used to secure a cover to a frame, the fastener having a width and a height, the retainer comprising:
    a housing formed within the frame and including an internal area;

an upper opening formed within the housing, the upper opening having a width that is slightly larger than the height of the fastener, the upper opening providing access to the internal area;

a lower opening formed within the housing, the lower opening having a width that is slightly smaller than the width of the fastener, the lower opening providing access to the internal area; and a ledge formed within the internal area and adjacent to the lower opening, the ledge including a step that functions in orienting the fastener into a horizontal position once inside the internal area;

wherein the upper opening is angled and whereby the fastener must be oriented at a similar angle to be inserted into the internal area, and wherein the step is formed at an angle, with the angle of the step matching the angle of the upper opening.

\* \* \* \* \*